US010078248B2

(12) United States Patent
Lim et al.

(10) Patent No.: US 10,078,248 B2
(45) Date of Patent: Sep. 18, 2018

(54) LIQUID CRYSTAL DISPLAY AND MANUFACTURING METHOD THEREOF

(71) Applicant: SAMSUNG DISPLAY CO., LTD., Yongin-si, Gyeonggi-do (KR)

(72) Inventors: Tae Woo Lim, Yongin-si (KR); Jung Woo Park, Seoul (KR); Sung Jun Kim, Hwaseong-si (KR); Kwang Soo Bae, Suwon-si (KR); Yu Deok Seo, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 172 days.

(21) Appl. No.: 15/062,846

(22) Filed: Mar. 7, 2016

(65) Prior Publication Data
US 2016/0320661 A1 Nov. 3, 2016

(30) Foreign Application Priority Data

Apr. 30, 2015 (KR) .................. 10-2015-0062101

(51) Int. Cl.
*G02F 1/1341* (2006.01)
*G02F 1/1368* (2006.01)
(Continued)

(52) U.S. Cl.
CPC .......... *G02F 1/1341* (2013.01); *G02F 1/1368* (2013.01); *G02F 1/13394* (2013.01);
(Continued)

(58) Field of Classification Search
CPC ............. G02F 1/133377; G02F 1/1368; G02F 1/13439; G02F 1/13394; G02F 1/1341;
(Continued)

(56) References Cited

U.S. PATENT DOCUMENTS 5,469,280 A * 11/1995 Jang ...................... G02F 1/1341
349/138
5,986,729 A * 11/1999 Yamanaka ............ G02F 1/1333
349/153
(Continued)

FOREIGN PATENT DOCUMENTS

EP 2908170 A1 8/2015
KR 10-2008-0002365 A 1/2008
(Continued)

OTHER PUBLICATIONS

Martin Wahl, "European Search Report," European Patent Application No. 16164624.5, European Patent Office, dated Aug. 1, 2016, 10 pages, Munich, Germany.

*Primary Examiner* — Edward Glick
*Assistant Examiner* — Shan Liu
(74) *Attorney, Agent, or Firm* — Innovation Counsel LLP

(57) ABSTRACT

A liquid crystal display according to an exemplary embodiment of the present disclosure includes: a substrate; a thin film transistor disposed on the substrate; a pixel electrode connected to the thin film transistor; a roof layer facing the pixel electrode; a liquid crystal layer including liquid crystal molecules disposed in a plurality of cavities between the pixel electrode and the roof layer; and wherein the roof layer comprises a partition, which extends substantially parallel to a gate line connected to the thin film transistor.

11 Claims, 29 Drawing Sheets

(51) Int. Cl.
*G02F 1/1343* (2006.01)
*G02F 1/1339* (2006.01)
*G02F 1/1333* (2006.01)

(52) U.S. Cl.
CPC .... *G02F 1/13439* (2013.01); *G02F 1/133377* (2013.01); *G02F 1/133345* (2013.01); *G02F 2001/133357* (2013.01); *G02F 2201/40* (2013.01)

(58) Field of Classification Search
CPC ........... G02F 1/133345; G02F 2201/40; G02F 2001/133357; G02F 1/1334; G02F 2001/13345; G02F 1/0107; G02F 1/1339; G02F 1/13392; G02F 1/161; G02F 2001/13396; G02F 2001/13398; G02F 1/133707; G02F 2201/42; C09K 19/544; G01N 27/205; H01L 27/3246; H01L 21/02107; H01L 21/31; H01L 21/469; H01L 27/224; H01L 27/2418; G09G 3/367
USPC ....... 349/86–94, 155–157, 138, 189–190, 52
See application file for complete search history.

(56) References Cited

U.S. PATENT DOCUMENTS

| | | | | |
|---|---|---|---|---|
| 2011/0221715 | A1* | 9/2011 | Yang | G02F 1/13454 345/204 |
| 2013/0250220 | A1* | 9/2013 | Kim | G02F 1/1341 349/123 |
| 2013/0293799 | A1* | 11/2013 | Lee | G02F 1/13394 349/42 |
| 2014/0176893 | A1* | 6/2014 | Sugitani | G02F 1/133305 349/143 |
| 2014/0362329 | A1* | 12/2014 | Lee | G02F 1/1341 349/86 |
| 2015/0036079 | A1 | 2/2015 | Yun et al. | |

FOREIGN PATENT DOCUMENTS

| | | |
|---|---|---|
| KR | 10-2014-0122884 A | 10/2014 |
| KR | 10-2014-0142965 A | 12/2014 |

* cited by examiner

LIQUID CRYSTAL DISPLAY AND MANUFACTURING METHOD THEREOF

CROSS-REFERENCE TO RELATED APPLICATION

This application claims priority to, and the benefit of, Korean Patent Application No. 10-2015-0062101 filed in the Korean Intellectual Property Office on Apr. 30, 2015, the entire contents of which are incorporated herein by reference.

BACKGROUND (a) Field

Embodiments of the present disclosure relate generally to display device. More specifically, embodiments of the present disclosure relate to a liquid crystal display and a manufacturing method thereof.

(b) Description of the Related Art

A liquid crystal display, which is one of the most widely used flat panel displays, includes two sheets of display panels on which electric field generating electrodes such as pixel electrodes, common electrodes, and the like are formed. A liquid crystal layer is then interposed therebetween.

The liquid crystal display generates an image by applying a voltage to the electric field generating electrodes, to thereby generate an electric field on the liquid crystal layer. This electric field determines or induces an alignment of liquid crystal molecules of the liquid crystal layer, thus controlling the polarization of incident light.

One type of liquid crystal display utilizes a plurality of microcavities formed within the pixels and filled with liquid crystal. Although the liquid crystal display according to the related art uses two sheets of substrates, the above-mentioned microcavity display allows the display panel's components to be formed on one substrate instead of two, and thus may have reduced weight, thickness, and the like.

In the microcavity display, a roof layer is formed in order to maintain the microcavities. The above roof layer may form partitions in areas overlapping the signal line, while being continuously connected between neighboring microcavities. Alignment defects may occur in the above-mentioned partition portions, and a width of a light blocking member corresponding to the partition may be widened taking into account the above-mentioned problem. However, in a case in which the width of the light blocking member is widened, an aperture ratio may be reduced.

The above information disclosed in this Background section is only for enhancement of understanding of the background of the disclosure and therefore it may contain information that does not form the prior art that is already known in this country to a person of ordinary skill in the art.

SUMMARY

Embodiments of the present disclosure provide a liquid crystal display having advantages of improved aperture ratio and a manufacturing method thereof.

In addition, embodiments of the present disclosure provide a liquid crystal display and a manufacturing method thereof having advantages of improving speed of a capping process.

An exemplary embodiment of the present disclosure provides a liquid crystal display including: a substrate; a thin film transistor disposed on the substrate; a pixel electrode connected to the thin film transistor; a roof layer facing the pixel electrode; a liquid crystal layer disposed in a plurality of cavities between the pixel electrode and the roof layer; and wherein the roof layer comprises a partition, which extends substantially parallel to a gate line connected to the thin film transistor.

Each of the cavities may correspond to a pixel row disposed along a direction in which the gate line extends.

The roof layer may include at least one inorganic layer.

A portion of the roof layer that overlaps a data line connected to the thin film transistor is planarized.

The liquid crystal display may further include a capping layer disposed on the roof layer, wherein the capping layer covers a trench disposed between adjacent cavities.

The roof layer may have a first side with an inlet part disposed therein, and the capping layer may cover the inlet part.

The roof layer may have a second side opposite to the first side, and at least one of the first and second sides may have the inlet part, wherein the inlet part has a plurality of inlet parts.

The inlet parts may include first inlet parts disposed on the first side and second inlet parts disposed on the second side, and the first inlet parts and the second inlet parts may be arranged in alternating manner.

The inlet parts may include first inlet parts disposed on the first side and second inlet parts disposed on the second side, and the first inlet parts and the second inlet parts may have different widths.

Each cavity may include an agglomeration induction part that protrudes outward therefrom, wherein the agglomeration induction part is surrounded by a protrusion part of the partition.

The agglomeration induction part may include a first agglomeration induction part and a second agglomeration induction part that are respectively disposed on a first side and an opposite second side of the each cavity.

The first agglomeration induction part and the second agglomeration induction part may face each other, and the liquid crystal display may further include pillars disposed within the corresponding cavity between the first agglomeration induction part and the second agglomeration induction part.

The agglomeration induction part may overlap the trench.

Another embodiment of the present disclosure provides a method of manufacturing a liquid crystal display including: forming a thin film transistor on a substrate; forming a pixel electrode on the thin film transistor; forming a sacrificial layer on the pixel electrode; forming a roof layer on the sacrificial layer; patterning the roof layer to form an inlet part and a partition which are oriented substantially parallel to each other; removing the sacrificial layer to form a plurality of spaces; and injecting an alignment material into the spaces through the inlet part.

The sacrificial layer may be formed so as to extend over the substantial entirety of a pixel row that extends substantially parallel to a gate line.

The pixel row may be a first pixel row, and the sacrificial layer may form a trench between the first pixel row and a second pixel row adjacent to the first pixel row.

The trench may be disposed between adjacent spaces.

The patterning the roof layer may include forming an agglomeration induction part that protrudes toward the trench.

The sacrificial layer may include a protrusion part corresponding to the agglomeration induction part.

The manufacturing method may further include forming a capping layer disposed on the roof layer, wherein the capping layer covers the inlet part.

According to an embodiment of the present disclosure, since the partitions partitioning adjacent microcavities are disposed along a portion in which the trench is positioned, the aperture ratio may be increased.

In addition, since a portion overlapping with the data line and disposed between adjacent microcavities may be made flatter, the speed of the capping process may be improved.

DETAILED DESCRIPTION OF THE EMBODIMENTS

Figure 1:
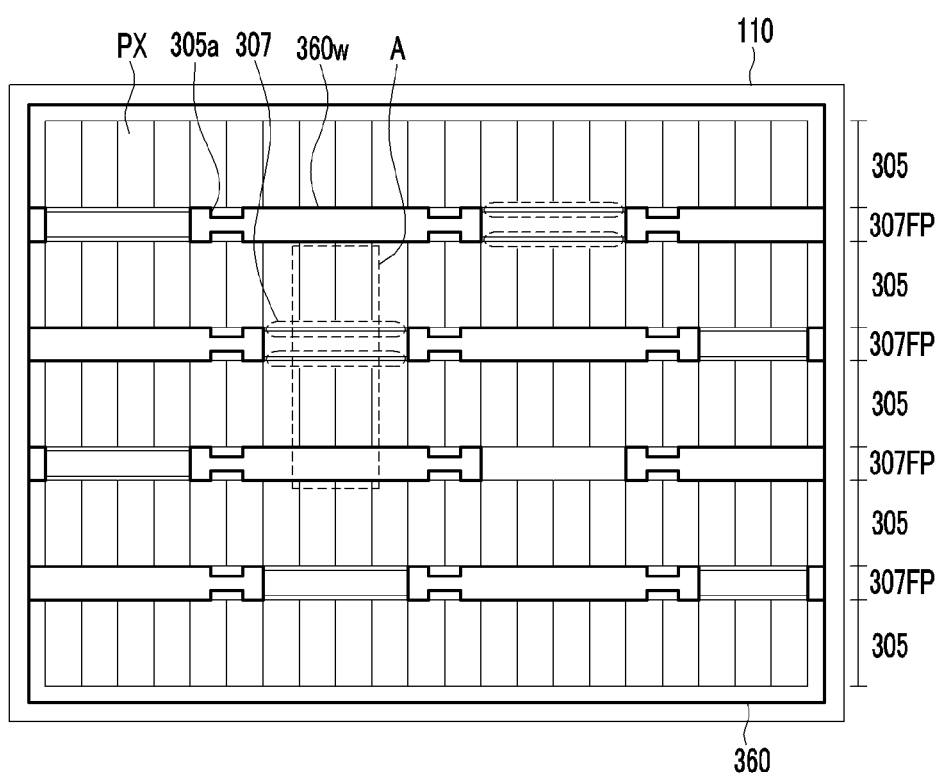
FIG. 1 is a plan view showing a liquid crystal display according to an exemplary embodiment of the present disclosure.

Exemplary embodiments of the present disclosure will be described in detail with reference to the accompanying drawings. However, the present disclosure is not limited to the exemplary embodiments which are described herein, and may be modified in various different ways. Rather, the exemplary embodiments of the present disclosure to be described below are provided so that the idea of the present disclosure can be sufficiently transferred to those skilled in the art to which the present disclosure pertains.

In the drawings, thicknesses of layers and regions are exaggerated for clarity. The various Figures are thus not to scale. In addition, in the case in which it is stated that a layer is present 'on' another layer or a substrate, the layer may be directly formed on another layer or the substrate or have the other layer interposed therebetween. Portions denoted by like reference numerals mean like elements throughout the specification.

All numerical values are approximate, and may vary. All examples of specific materials and compositions are to be taken as nonlimiting and exemplary only. Other suitable materials and compositions may be used instead.

Figure 2:
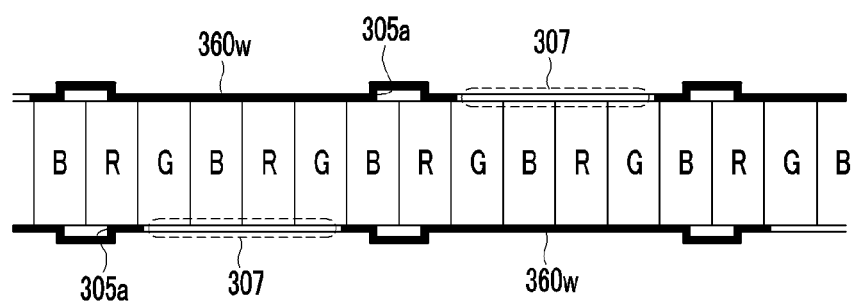
FIG. 2 shows one pixel row in the liquid crystal display of FIG. 1.
Figure 3:
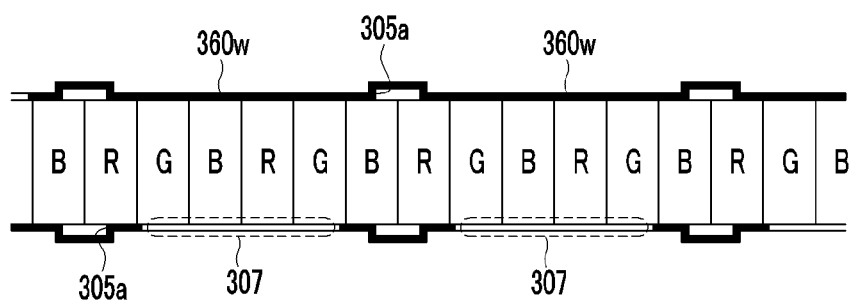
FIG. 3 shows a modified example of the liquid crystal display described in FIG. 2.

FIG. 1 is a plan view showing a liquid crystal display according to an exemplary embodiment of the present disclosure. FIG. 2 shows one pixel row in the liquid crystal display of FIG. 1. FIG. 3 shows a modified example of the liquid crystal display described in FIG. 2.

Referring to FIG. 1, a liquid crystal display according to the present exemplary embodiment may include a roof layer 360 disposed on a substrate 110 and formed of at least one inorganic layer. According to the present exemplary embodiment, the roof layer 360 covers most of a plurality of pixels PX, and the roof layer 360 is formed as a continuous layer that covers multiple pixel rows and that forms trenches inbetween. For example, the roof layer 360 forms a trench 307FP between a first pixel row and a second pixel row which are adjacent to each other in the vertical direction of FIG. 1 (i.e., the top two pixel rows of FIG. 1). According to the present exemplary embodiment, the trench 307FP may be covered with the roof layer 360 or may be covered with a capping layer to be described below in order to block an inlet part 307. The pixel rows described above each include multiple pixels PX which are horizontally arranged.

The roof layer 360 may be disposed along the pixel rows in order to maintain a plurality of spaces 305 formed so as to correspond to the respective pixel rows, and may include a partition 360w formed in a part of an interface at which the trench 307FP and the space 305 come in contact with each other. According to the present exemplary embodiment, the partition 360w may have a structure surrounding a side part of the space 305 in order to partition the space 305, and may be formed to extend substantially parallel to a gate line.

According to the present exemplary embodiment, an inlet part 307 is formed at a location at which the trench 307FP and the space 305 come in contact with each other, so that an alignment material and a liquid crystal material may be injected into the plurality of spaces 305 during manufacture. The inlet part 307 may subsequently be covered with a capping layer to be described below. According to the present exemplary embodiment, the inlet part 307 and the partition 360w may be arranged so as to be parallel to each other.

Hereinafter, the partition 360w and the inlet part 307 in the liquid crystal display according to an exemplary embodiment of the present disclosure will be described in further detail with reference to FIGS. 2 and 3.

Referring to FIG. 2, a pixel row including a plurality of pixels PX may include a red pixel R, a green pixel G, and a blue pixel B. The pixel row may correspond to the space 305 including the liquid crystal material, and in this case, the space 305 may have a structure that does not form microcavities for each pixel but instead forms a single cavity extending across the entire pixel row. The inlet part 307 may be formed in at least one of an upper side and a lower side of the pixel row. In this case, when the inlet part 307 positioned in the upper side of the pixel row is defined as a first inlet part and the inlet part 307 positioned in the lower side is defined as a second inlet part, the first inlet part and the second inlet part may be alternately arranged. The partition 360w and the inlet part 307 may face each other and are alternately arranged along the sides of the pixel row. According to the present exemplary embodiment, the partition 360w includes protrusions that outward from the cavity and toward the trench 307FP shown in FIG. 1. A agglomeration induction part 305a may be a recess in the cavity, formed by the partition 360w. Dried alignment material left after forming an alignment layer may remain in the agglomeration induction part 305a. According to the present exemplary embodiment, the agglomeration induction part 305a is a recess in the cavity wall, formed by the protrusion of partition 360w outward from the cavity wall. When the agglomeration induction part 305a positioned in an upper side one of a pixel row is defined as a first agglomeration induction part and the agglomeration induction part 305a positioned in a lower side of that row is defined as a second agglomeration induction part, the first agglomeration induction part and the second agglomeration induction part may face each other.

The exemplary embodiment of FIG. 3 is mostly to the same as the exemplary embodiment described in FIG. 2, and hereinafter, it is mainly only the differences between the two that will be described.

Referring to FIG. 3, the partitions 360w are all formed in the upper side of a pixel row and the inlet parts 307 are all formed in the lower side of that pixel row. On the contrary, the partitions 360w may be all formed in the lower side of the pixel row, and the inlet parts 307 may also be all formed in the upper side thereof.

Hereinafter, the liquid crystal display according to the exemplary embodiment of the present disclosure will be described in more detail with reference to FIGS. 4 to 7.

Figure 4:
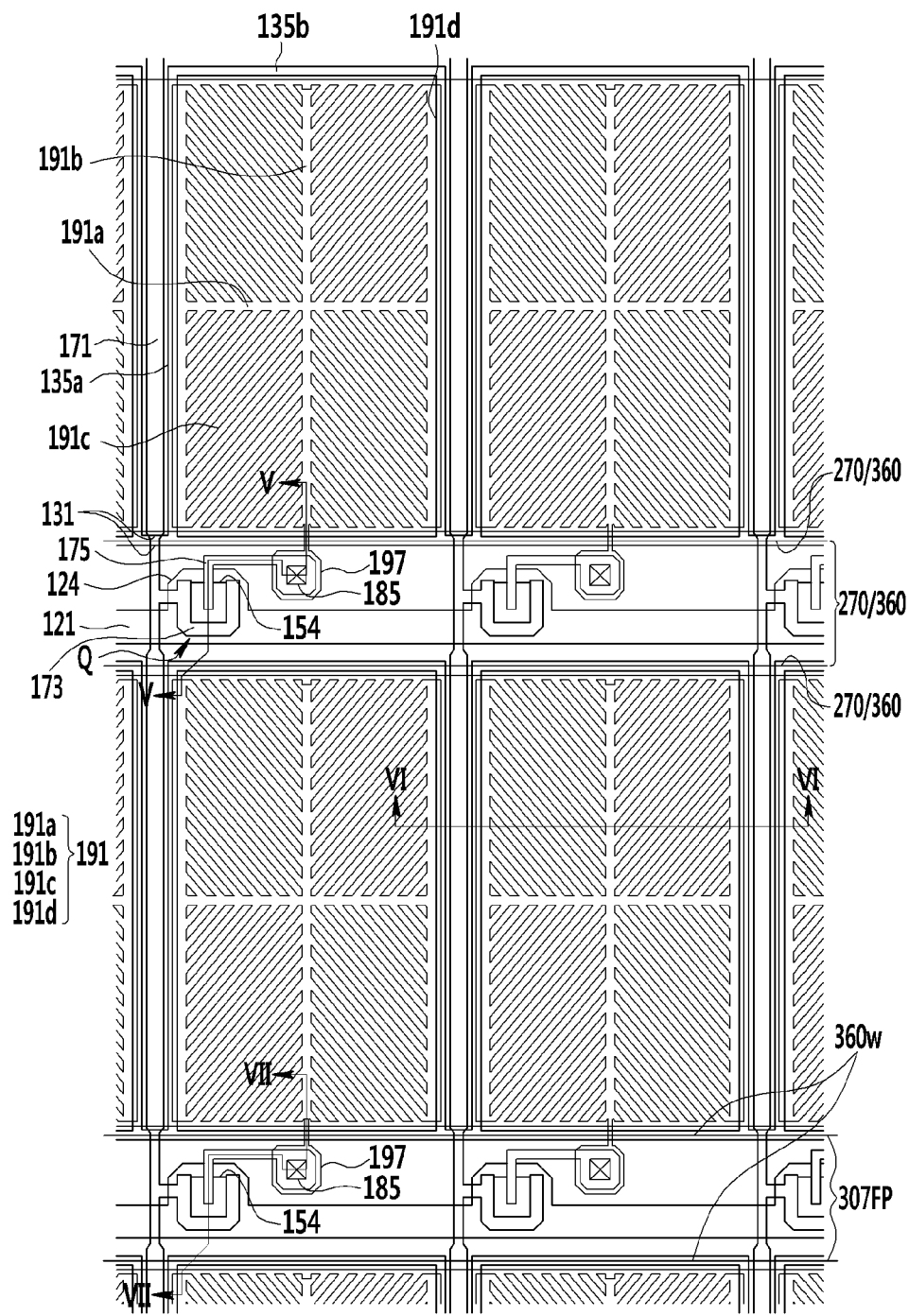
FIG. 4 is an enlarged plan view showing an area A of FIG. 1.
Figure 5:
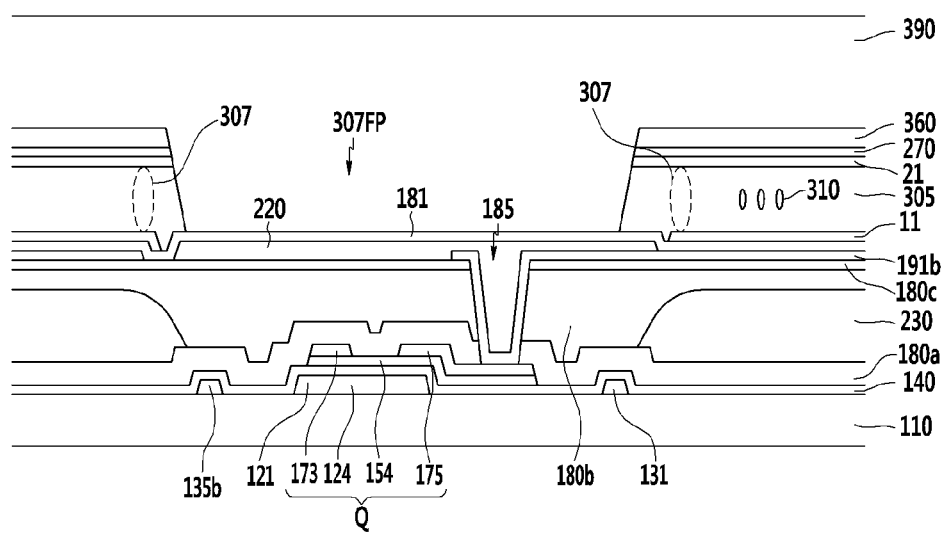
FIG. 5 is a cross-sectional view taken along a cutting line V-V of FIG. 4.
Figure 6:
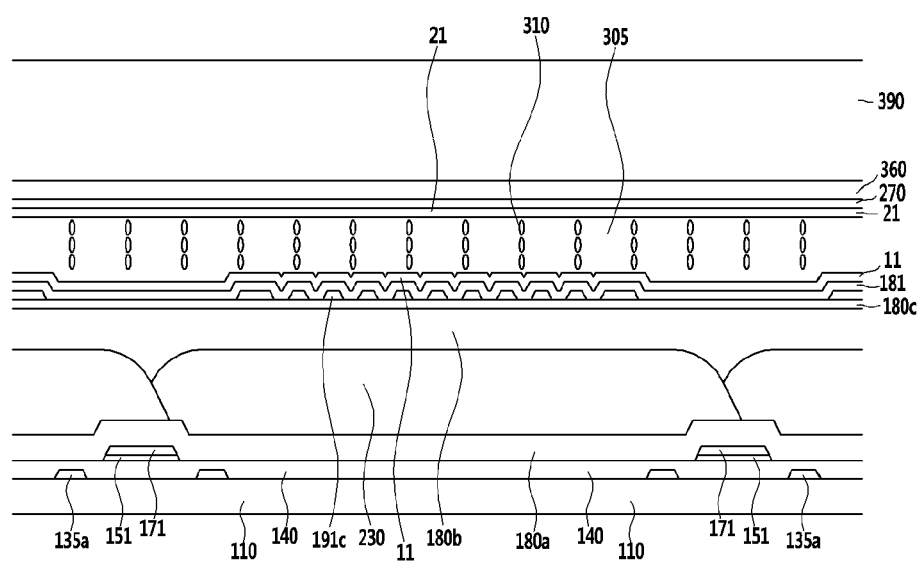
FIG. 6 is a cross-sectional view taken along a cutting line VI-VI of FIG. 4.
Figure 7:
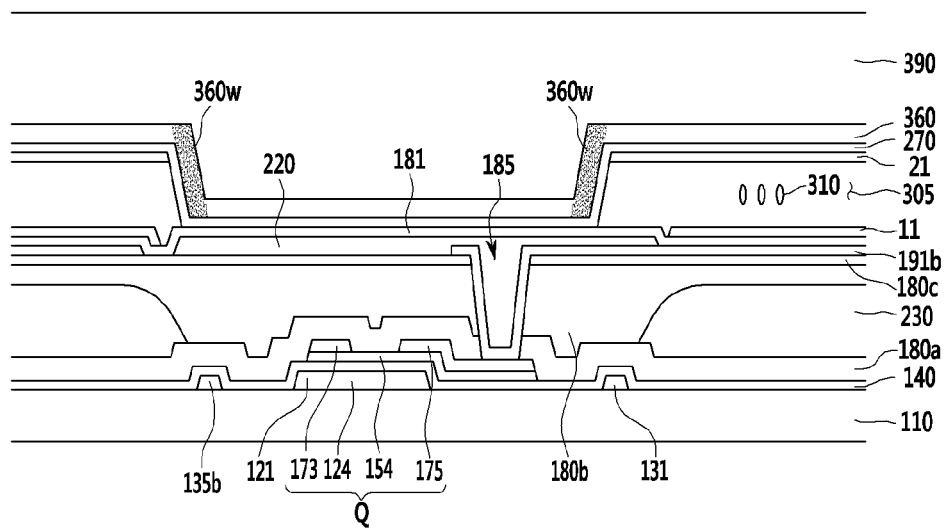
FIG. 7 is a cross-sectional view taken along a cutting line VII-VII of FIG. 4.

FIG. 4 is an enlarged plan view showing an area A of FIG. 1. FIG. 5 is a cross-sectional view taken along a cutting line V-V of FIG. 4. FIG. 6 is a cross-sectional view taken along a cutting line VI-VI of FIG. 4. FIG. 7 is a cross-sectional view taken along a cutting line VII-VII of FIG. 4. FIG. 4 illustrates a 2×2 pixel arrangement from the display of FIG. 1, and in the liquid crystal display according to the exemplary embodiment of the present disclosure, the above-mentioned pixel arrangement may be regularly repeated in both horizontal and vertical directions.

Referring to FIGS. 4 to 7, a gate line 121 and a sustain electrode line 131 are formed on a substrate 110 which is made of transparent glass, plastic, or the like. The gate line 121 includes a gate electrode 124. The sustain electrode line 131 mainly extends in the horizontal direction and transfers a defined voltage such as a common voltage Vcom, or the like. The sustain electrode line 131 includes a pair of vertical parts 135a extend substantially perpendicular to the gate line 121, and a horizontal part 135b that connects ends of the pair of vertical parts 135a to each other. The sustain electrode parts 135a and 135b are shaped to surround their pixel electrode 191.

A gate insulating layer 140 is formed on the gate line 121 and the sustain electrode line 131. A linear semiconductor layer 151 and semiconductor layer 154 are formed on the gate insulating layer 140. The linear semiconductor layer 151 is disposed below the data line 171 and the semiconductor layer 154 corresponds to a lower portion of a source/drain electrode and a channel area of a thin film transistor Q. The linear semiconductor layer 151 and the semiconductor layer 154 may be connected to each other.

A plurality of ohmic contacts may be formed between the linear semiconductor layer 151 and the data line 171, as well as between the semiconductor layer 154 and the source/drain electrode, but the ohmic contacts are omitted in the drawings.

Data conductors 171, 173, and 175 including a source electrode 173, the data line 171 connected to the source electrode 173, and the drain electrode 175 are formed on the respective semiconductor layers 151 and 154 and the gate insulating layer 140. Here, the data line 171 may serve as a light blocking member for preventing light leakage.

The gate electrode 124, the source electrode 173, and the drain electrode 175 form the thin film transistor Q together with the semiconductor layer 154, and a channel of the thin film transistor Q is formed in an exposed semiconductor layer portion between the source electrode 173 and the drain electrode 175.

A first interlayer insulating layer 180a is formed on the data conductors 171, 173, and 175 and the exposed semiconductor layer portion. The first interlayer insulating layer 180a may include an inorganic insulating material such as silicon nitride (SiNx) or silicon oxide (SiOx), or an organic insulating material.

A color filter 230 is formed on the first interlayer insulating layer 180a.

The color filter 230 may display a primary color such as one of red, green, and blue. However, the colors that the color filter 230 may display are not limited to the three primary colors red, green, and blue. For example, the color filter 230 may also display one of cyan, magenta, yellow, and white. The color filter 230 may be formed of a material that displays different colors for different pixels.

A second interlayer insulating layer 180b covering the color filter 230 is formed on the color filter 230. The second interlayer insulating layer 180b may include an inorganic insulating material such as silicon nitride (SiNx) or silicon oxide (SiOx), or an organic insulating material.

In the case in which neighboring color filters 230 overlap each other to thereby form a step, the step may be reduced or removed by allowing the second interlayer insulating layer 180b to include organic insulating material.

The interlayer insulating layers 180a and 180b are provided with contact holes 185 that expose the drain electrode 175.

The pixel electrode 191 is disposed on the second interlayer insulating layer 180b. The pixel electrode 191 may be made of a transparent conductive material such as ITO, IZO, or the like.

The pixel electrode 191 is shaped as a quadrangle in plan view, and includes a cross stem part including a horizontal stem part 191a and a vertical stem part 191b intersecting the horizontal stem part 191a. In addition, the pixel electrode 191 is partitioned into four sub-regions by the horizontal stem part 191a and the vertical stem part 191b and each of the sub-regions includes a plurality of fine branch parts 191c. Further, according to the present exemplary embodiment, the pixel electrode 191 may further include an outer stem part 191d connecting the fine branch parts 191c at left and right outer parts of the pixel electrode 191. According to the present exemplary embodiment, the outer stem part 191d is disposed at the left and right outer parts of the pixel electrode 191, but may also be disposed so as to be extended up to an upper portion or a lower portion of the pixel electrode 191.

The fine branch part 191c of the pixel electrode 191 forms an angle of approximately 40° to 45° with the gate line 121 or the horizontal stem part. In addition, the fine branch parts of two neighboring sub-regions may be perpendicular to each other. In addition, the fine branch part may have a width which is gradually increased or decreased with distance from the cross stem part, or an interval between the fine branch parts 191c may be differ with position.

The pixel electrode 191 includes an extension part 197 connected to a lower end of the vertical stem part 191b and having an area wider than that of the vertical stem part 191b. The extension part 197 of the pixel electrode 191 is physically and electrically connected to the drain electrode 175 through the contact hole 185, and thereby receives a data voltage from the drain electrode 175.

The description of the thin film transistor Q and the pixel electrode 191 described above is exemplary only, and other configurations and structures may be employed. For example, in order to improve side visibility, a structure of the thin film transistor and a design of the pixel electrode are not limited to the structure described in the present exemplary embodiment, but may be modified to reflect the contents according to other exemplary embodiments of the present disclosure.

The light blocking member 220 is disposed on the pixel electrode 191 so as to cover the region in which the thin film transistor Q is formed (e.g., the area between pixels). The light blocking member 220 according to the present exemplary embodiment may be formed along a direction in which the gate line 121 is extended. The light blocking member 220 may be formed of a material capable of blocking light.

The insulating layer 181 may be formed on the light blocking member 220, and the insulating layer 181 may cover the light blocking member 220 and may be formed so as to be extended over part of the pixel electrode 191.

A lower alignment layer 11 is formed on the pixel electrode 191 and the lower alignment layer 11 may be a vertical alignment layer. The lower alignment layer 11, which is a liquid crystal alignment layer made of a material such as polyamic acid, polysiloxane, polyimide, or the like, may be formed to include at least one of these materials or any other materials suitable for forming an alignment layer. In addition, the lower alignment layer 11 may be an optical alignment layer.

An upper alignment layer 21 is disposed at a portion facing the lower alignment layer 11, and a plurality of spaces or cavities 305 including liquid crystal molecules 310 are formed between the lower alignment layer 11 and the upper alignment layer 21. In FIG. 4, two pixel rows are shown, and the trench 307FP is formed between an upper pixel row and a lower pixel row. The trench 307FP is a space formed during a manufacturing process, and may be covered with the capping layer 390 to be described below in the final structure.

The common electrode 270 and the roof layer 360 are disposed on the upper alignment layer 21. The common electrode 270 receives a common voltage and generates an electric field together with the pixel electrode 191 which receives the data voltage, so as to determine a direction in which the liquid crystal molecule 310 disposed in the space 305 is tilted. The common electrode 270 may be made of a transparent conductive material such as ITO, IZO, or the like. The common electrode 270 forms a capacitor together with the pixel electrode 191, to thereby maintain the applied voltage even after the thin film transistor is turned-off. The roof layer 360 is an inorganic insulating layer formed of an inorganic material such as silicon nitride (SiNx) or silicon oxide (SiOx). The roof layer 360 may be formed of a single inorganic layer, and in this case, the inorganic layer may have tensile stress and may be formed to have a thickness of about 6000 angstrom (Å) to about 12000 angstrom (Å).

The inlet part 307 is formed in an interface between the trench 307FP and the space 305, between the upper pixel row and the lower pixel row shown in FIGS. 4 and 5. The inlet part 307 may serve as a passage or opening that allows an alignment material and a liquid crystal material to be injected into the space 305 during the manufacturing process. Together with the trench 307FP, the inlet part 307 may be covered with the capping layer 390 in the final structure.

In the present exemplary embodiment, the alignment material forming the alignment layers 11 and 21 and the liquid crystal material including the liquid crystal molecules 310 may be injected into the plurality of spaces 305 using capillary force.

Referring to FIG. 6, according to the present exemplary embodiment, each of the plurality of spaces 305 extends along an entire pixel row, and particularly, does not have any barriers or partitions even in portions overlapping the data line 171. Therefore, the portion of upper space 305 overlying the data line 171 may also include the liquid crystal molecules 310. Thus, as no barriers or other structures are required to partition the liquid crystal over the data lines 171, the aperture ratio of the display may be improved. In addition, since no such barriers or partitions are present, the roof layer 360 may be made flatter than if it were made to overlay multiple barriers. Therefore, when an encapsulation process is performed by a method of photo-curing a capping material, the process may be more rapidly performed.

Referring to FIG. 7, the partition 360w is formed in an interface between the trench 307FP and the space 305. The roof layer 360 covers the trench 307FP in addition to the common electrode 270, and includes the partition 360w surrounding a side part of the space 305. Here, the partition 360w is formed along a direction in which the gate line 121 is extended, and may serve to vertically partition the plurality of spaces 305.

Referring to FIGS. 5 to 7, a capping layer 390 is disposed on the roof layer 360. The capping layer 390 includes an organic material or an inorganic material. According to the present exemplary embodiment, the capping layer 390 may be in contact with an upper surface of a roof layer 360 that is an inorganic layer. The capping layer 390 may be disposed in the trench 307FP as well as on the roof layer 360. In this case, the capping layer 390 may cover the inlet part 307 exposed by the trench 307FP. Although the present exemplary embodiment describes the case in which the liquid crystal material is removed from the trench 307FP, the liquid crystal material left after being injected into the plurality of spaces 305 may alternatively remain in the trench 307FP.

Hereinafter, exemplary embodiments in which a structure of the roof layer according to an exemplary embodiment of the present disclosure is modified will be described.

Figure 8:
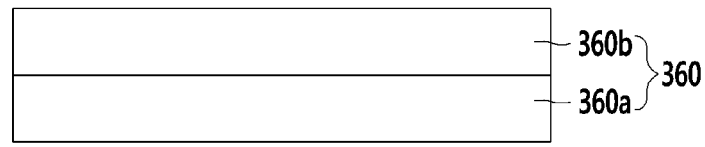
FIG. 8 is a schematic cross-sectional view of a roof layer according to an exemplary embodiment of the present disclosure.
Figure 9:
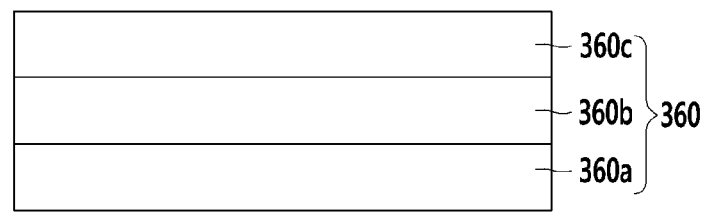
FIG. 9 shows a modified example of the roof layer described in FIG. 8.

FIG. 8 is a schematic cross-sectional view of a roof layer according to an exemplary embodiment of the present disclosure. FIG. 9 shows a modified example of the roof layer described in FIG. 8.

Referring to FIG. 8, unlike those described above, the roof layer 360 may be formed of two layers of inorganic material. The roof layer 360 may include a first inorganic layer 360a and a second inorganic layer 360b which have different pre-stresses. For example, the first inorganic layer 360a may have a compressive stress and the second inorganic layer 360b may have a tensile stress. Alternatively, the first inorganic layer 360a may have a tensile stress and the second inorganic layer 360b may have a compressive stress. As in the present exemplary embodiment, stress of the roof layer 360 may be controlled by forming multiple inorganic layers having different stress characteristics. Therefore, deformation of the roof layer 360 may be reduced or minimized.

Referring to FIG. 9, the roof layer 360 is disposed so that the first inorganic layer 360a, the second inorganic layer 360b, and a third inorganic layer 360c are sequentially stacked. In this case, the first inorganic layer 360a may have compressive stress, the second inorganic layer 360b may have tensile stress, and the third inorganic layer 360c may have compressive stress. Alternatively, the first inorganic layer 360a may have tensile stress, the second inorganic layer 360b may have compressive stress, and the third inorganic layer 360c may have tensile stress. In other words, according to the present exemplary embodiment, the first inorganic layer 360a and the third inorganic layer 360c may have stress of the same property.

The present exemplary embodiment illustrates the case in which the roof layer 360 is a triple-layer structure, but the roof layer 360 is not limited thereto. For example, the roof layer 360 may be formed by alternately stacking any number of inorganic layers having different stresses.

Figure 10:
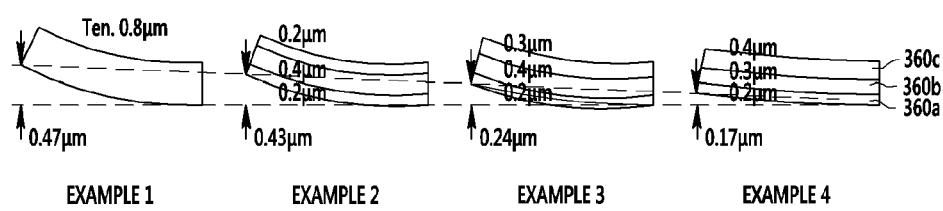
FIG. 10 is a diagram showing a delamination degree of the roof layer in the vicinity of an inlet part depending on a change in thickness of the roof layer according to an exemplary embodiment of the present disclosure.

FIG. 10 is a diagram showing a delamination degree of the roof layer in the vicinity of an inlet part depending on a change in thickness of the roof layer, and according to an exemplary embodiment of the present disclosure. Portions indicating thicknesses by arrows in FIG. 10 indicate portions in which the roof layer 360 is delaminated at a position which is adjacent to the trench 307FP in FIG. 5.

Referring to FIG. 10, in Example 1, a single inorganic layer having tensile pre-stress is formed so as to have a thickness of 0.8 μm. In Example 2, the first inorganic layer 360a having compressive pre-stress is formed so as to have a thickness of 0.2 μm, the second inorganic layer 360b having tensile pre-stress is formed so as to have a thickness of 0.4 μm, and the third inorganic layer 360c having compressive pre-stress is formed so as to have a thickness of 0.2 μm. In Example 3, the first inorganic layer 360a having compressive pre-stress is formed so as to have a thickness of 0.2 μm, the second inorganic layer 360b having tensile pre-stress is formed so as to have a thickness of 0.4 μm, and the third inorganic layer 360c having compressive pre-stress is formed so as to have a thickness of 0.3 μm. In Example 4, the first inorganic layer 360a having compressive pre-stress is formed so as to have a thickness of 0.2 μm, the second inorganic layer 360b having tensile pre-stress is formed so as to have a thickness of 0.3 μm, and the third inorganic layer 360c having compressive pre-stress is formed so as to have a thickness of 0.4 μm.

In Example 1, an inlet part delamination phenomenon of 0.47 μm is observed. In Example 2, Example 3, and Example 4, in the case in which the roof layer 360 is formed by alternately stacking inorganic layers having different stresses, an inlet part delamination degree is reduced below 0.45 μm. Specifically, an inlet part delamination in Example 2 is 0.43 μm, an inlet part delamination in Example 3 is 0.24 μm, and an inlet part delamination in Example 4 is 0.17 μm, and the inlet part delamination phenomenon may be minimized by adjusting the thickness and stress of the inorganic layer.

Figure 11:
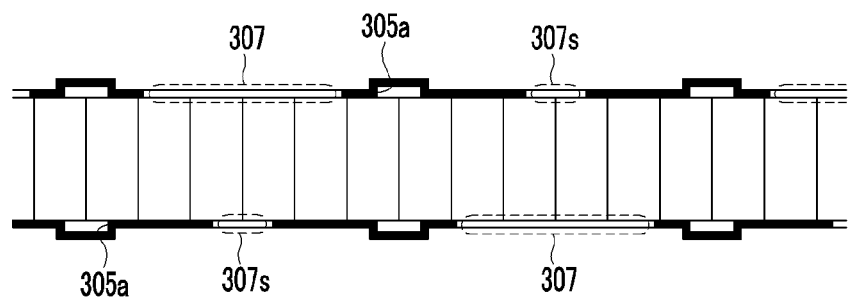
FIG. 11 shows an example in which a width of the inlet part is varied in the liquid crystal display according to an exemplary embodiment of the present disclosure.

FIG. 11 shows an example in which a width of the inlet part is varied in the liquid crystal display according to an exemplary embodiment of the present disclosure.

Referring to FIG. 11, a width of the inlet part 307 according to the present exemplary embodiment may differ at different locations along the cavity. For example, a first inlet part 307 and a second inlet part 307s may face each other along the same pixel row. In this case, the second inlet part 307s has a width smaller than that of the first inlet part 307. The second inlet part 307s may be formed parallel to the first inlet part 307.

Figure 12:
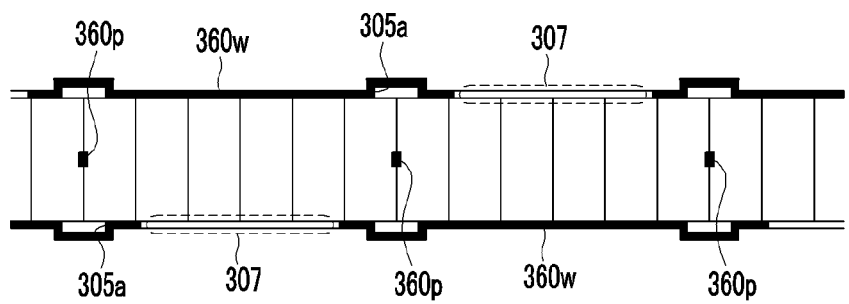
FIG. 12 shows an example in which an exemplary embodiment of FIG. 2 further includes pillars.

FIG. 12 shows an example in which an exemplary embodiment of FIG. 2 further includes pillars.

Referring to FIG. 12, the agglomeration induction part 305a includes a first agglomeration induction part and a second agglomeration induction part which face each other, and a pillar 360p is disposed between the first agglomeration induction part and the second agglomeration induction part. The pillar 360p may be formed of the same material as that of the partition 360w and may support the roof layer 360.

Figure 13:
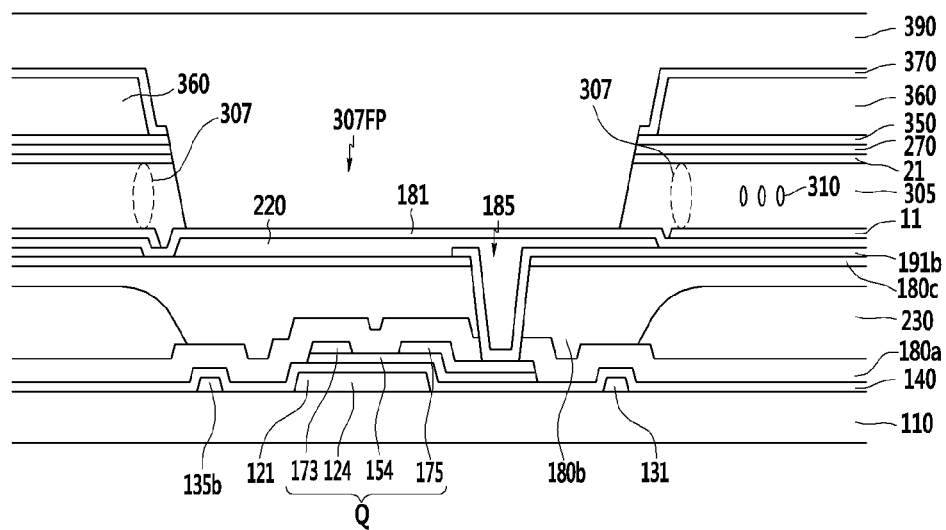
FIG. 13 shows an example in which the roof layer is modified in the liquid crystal display of FIG. 4.

FIG. 13 shows an example in which the roof layer is modified in the liquid crystal display of FIG. 4.

The contents described in FIGS. 1 to 7 are mostly applied to the present exemplary embodiment, and hereinafter, only portions that are different from those of FIGS. 1 to 7 will be described.

Referring to FIG. 13, the roof layer 360 may be formed of an organic layer. The lower insulating layer 350 is disposed between the common electrode 270 and the roof layer 360, and the upper insulating layer 370 is disposed between the roof layer 360 and the capping layer 390.

Figure 14:
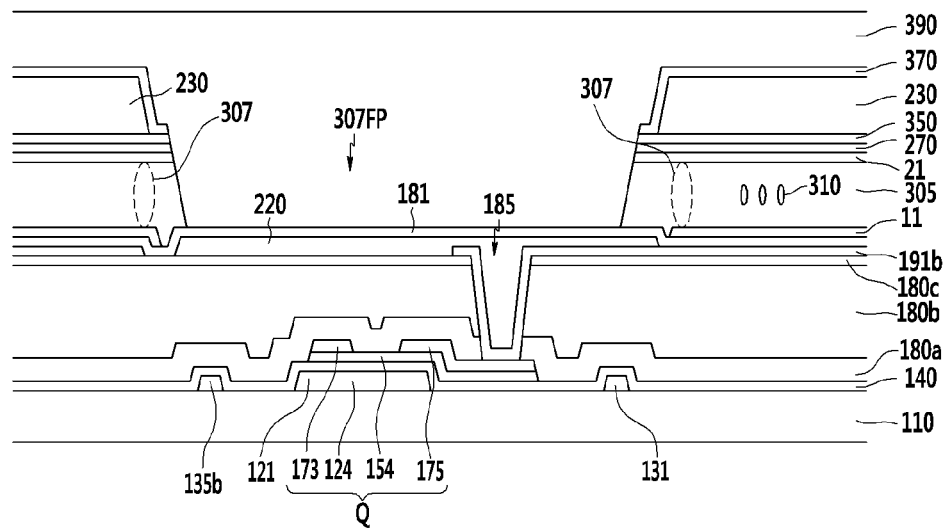
FIG. 14 shows an example in which the roof layer is modified in the liquid crystal display of FIG. 4.

FIG. 14 shows an example in which the roof layer is modified from that of the liquid crystal display of FIG. 4.

The various features described in FIGS. 1 to 7 are mostly applied to the present exemplary embodiment, and hereinafter, only differences from those features will be described.

Referring to FIG. 14, the roof layer is formed of the color filter 230. That is, the color filter 230 is formed over the cavity 305, rather than under it, and acts as the roof layer for the cavity 305. The lower insulating layer 350 is disposed between the common electrode 270 and the color filter 230, and the upper insulating layer 370 is disposed between the color filter 230 and the capping layer 390. According to the present exemplary embodiment, a process of forming the color filter between the first interlayer insulating layer 180a and the second interlayer insulating layer 180b is omitted by forming the color filter 230 as the roof layer instead, thereby making it possible to simplify the manufacturing process.

Hereinafter, an example of a method of manufacturing the liquid crystal display as described above will be described with reference to FIGS. 15 to 23. The example to be described below is one exemplary embodiment of a method of manufacture, and may take on various other forms.

Figure 15:
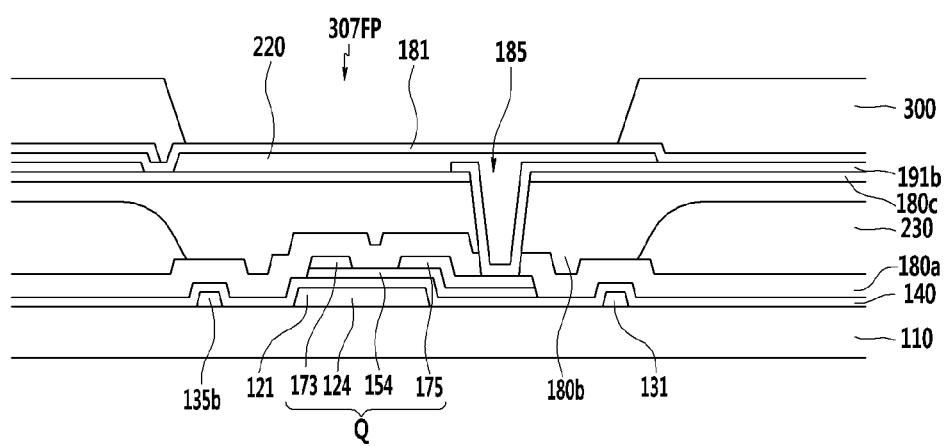
FIGS. 15 to 25 are cross-sectional views and exploded perspective views showing a manufacturing method for a liquid crystal display according to an exemplary embodiment of the present disclosure.
Figure 16:
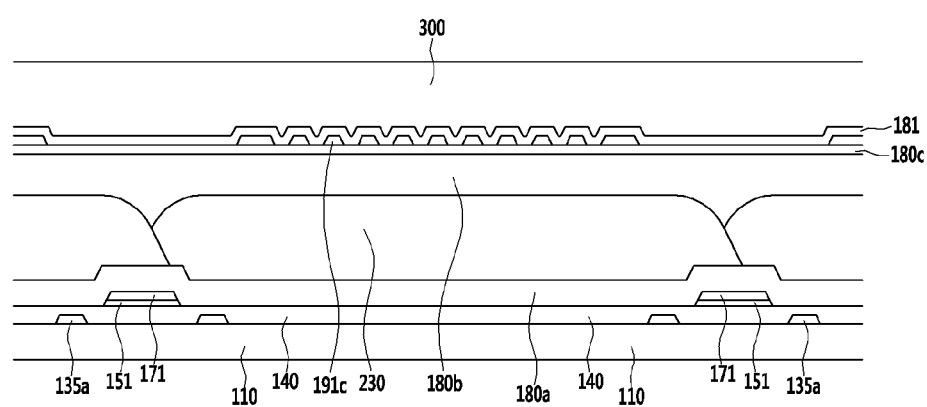
Figure 17:
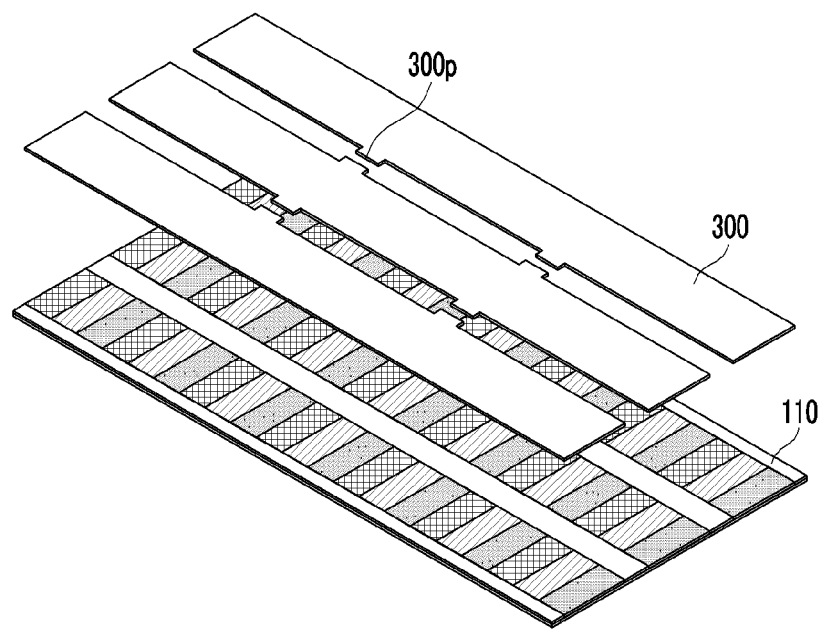
Figure 19:
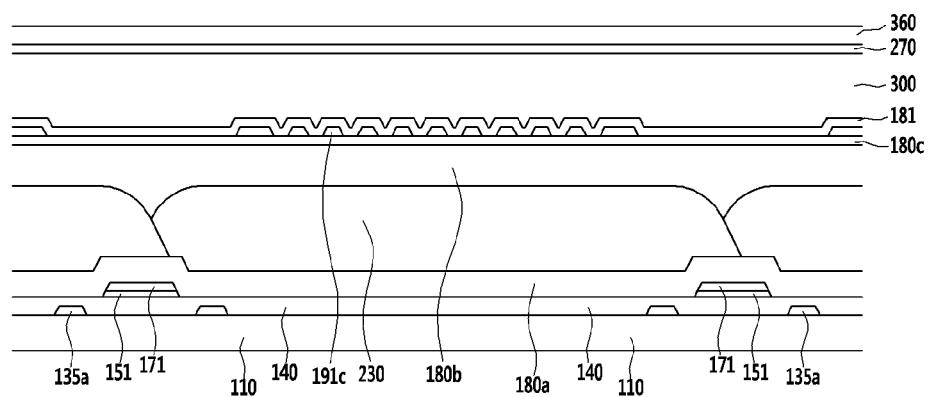
Figure 20:
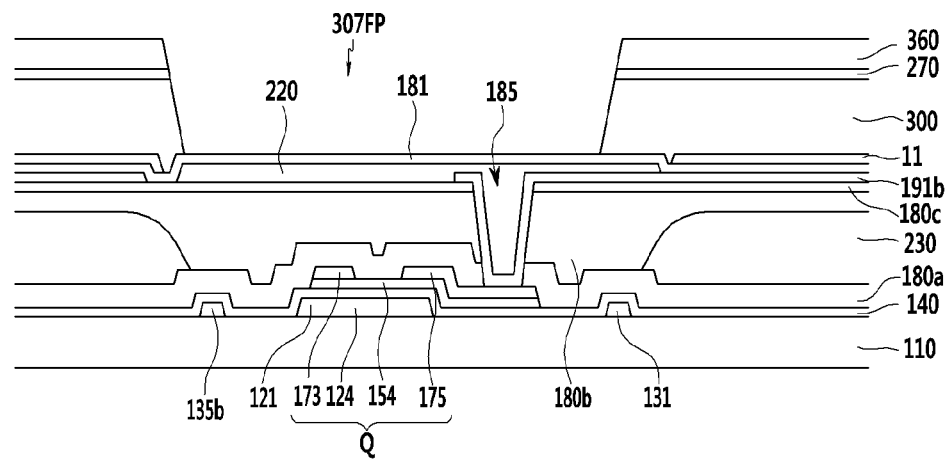
Figure 21:
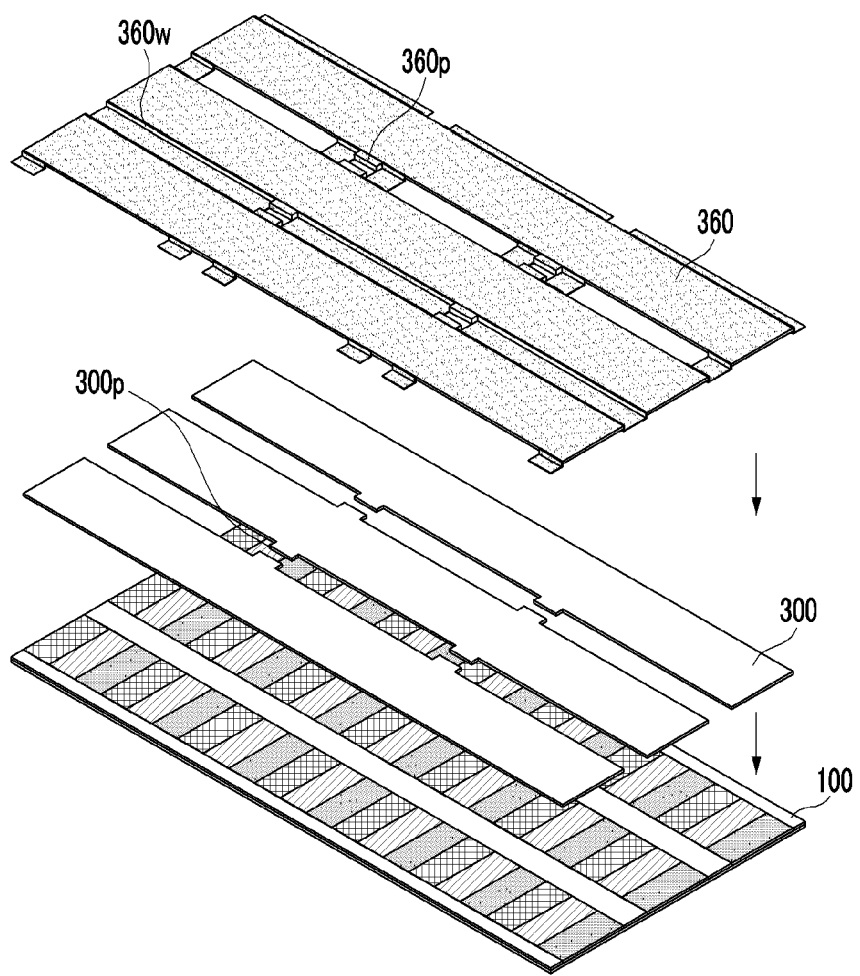

FIGS. 15 to 25 are cross-sectional views and coupling perspective views showing a method of manufacturing a liquid crystal display according to an exemplary embodiment of the present disclosure. FIGS. 15, 18, 20, 22, and 24 sequentially show cross-sectional views taken along a cutting line V-V of FIG. 4. FIGS. 16, 19, 23, and 25 sequentially show cross-sectional views taken along a cutting line VI-VI of FIG. 4. FIGS. 17 and 21 are exploded perspective views showing steps of forming a sacrificial layer 300 and the roof layer 360, respectively.

Referring to FIGS. 4, 15 and 16, in order to form a switching element on the substrate 110, the gate line 121 which is extended in the horizontal direction is formed, the gate insulating layer 140 is formed on the gate line 121, the semiconductor layers 151 and 154 are formed on the gate insulating layer 140, and the source electrode 173 and the drain electrode 175 are formed on the semiconductor layers 151 and 154. In this case, the data line 171 connected to the source electrode 173 may be formed so as to extend in the vertical direction while intersecting with the gate line 121. The resulting switching element is known.

The first interlayer insulating layer 180a is formed on the source electrode 173, the drain electrode 175, and the data line 171, and the exposed semiconductor layer 154 portion.

The second interlayer insulating layer 180b and the third interlayer insulating layer 180c are formed on the first interlayer insulating layer 180a, and the contact hole 185 is formed through the first interlayer insulating layer 180a, the second interlayer insulating layer 180b, and the third interlayer insulating layer 180c. Next, the pixel electrode 191 is formed on the third interlayer insulating layer 180c so as to be electrically and physically connected to the drain electrode 175 through the contact hole 185.

The light blocking member 220 is formed on the pixel electrode 191 or the third interlayer insulating layer 180c. The light blocking member 220 may be formed along a direction in which the gate line 121 extends, e.g. over the gate line 121. The light blocking member 220 may be formed of a material capable of blocking light. The insulating layer 181 may be formed on the light blocking member 220, and the insulating layer 181 may be formed so as to extend over the pixel electrode 191 while covering the light blocking member 220.

Next, the sacrificial layer 300 is formed on the pixel electrode 191. In this case, the trench 307FP is formed in the sacrificial layer 300 to extend parallel to the gate line 121. The sacrificial layer 300 may be formed of photoresist or other organic materials.

Referring to FIG. 17, the sacrificial layer 300 includes a protrusion part 300p. The protrusion part 300p of the sacrificial layer may have a structure that protrudes toward, or extends into, the trench 307FP. The protrusion part 300p corresponds to a portion in which the agglomeration induction part, to be described below, is formed.

Figure 18:
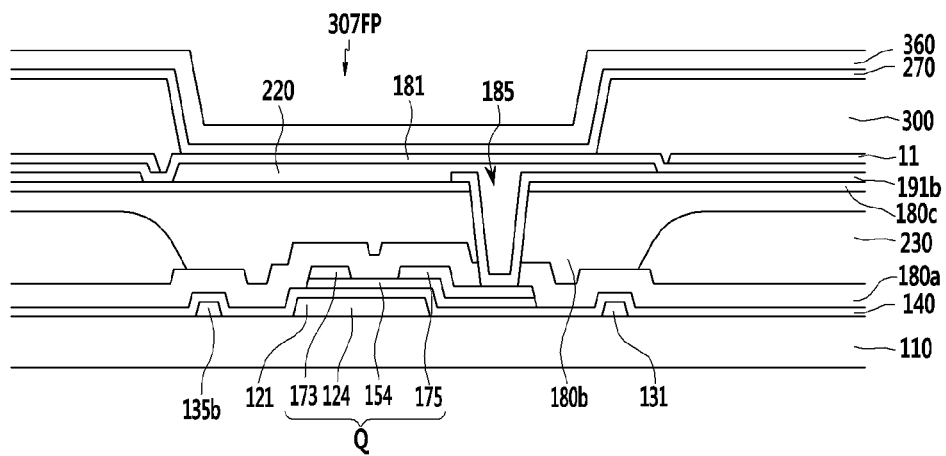

Referring to FIGS. 18 and 19, the common electrode 270 and the roof layer 360 are sequentially formed on the sacrificial layer 300. As shown in FIG. 18, the common electrode 270 and the roof layer 360 may each cover the trench 307FP. In the case of FIG. 19, the roof layer 360 is formed to be planarized on the sacrificial layer 300 portion corresponding to the data line 171.

Referring to FIG. 20, parts of the roof layer 360 and the common electrode 270 positioned over the light blocking member 220 may be removed by patterning the roof layer 360 and the common electrode 270. In this case, a side part of the sacrificial layer 300 is exposed. Referring to FIG. 21, parts of the roof layer 360 are removed to expose the underlying sacrificial layer 300, while the remainder of the roof layer 360 continues to cover the underlying layers and thus forming structures such as the partition 360w. In addition, a protrusion part 360 of the roof layer may be formed by forming the roof layer 360 so as to surround the protrusion part 300p of the sacrificial layer shown in FIG. 17.

Figure 22:
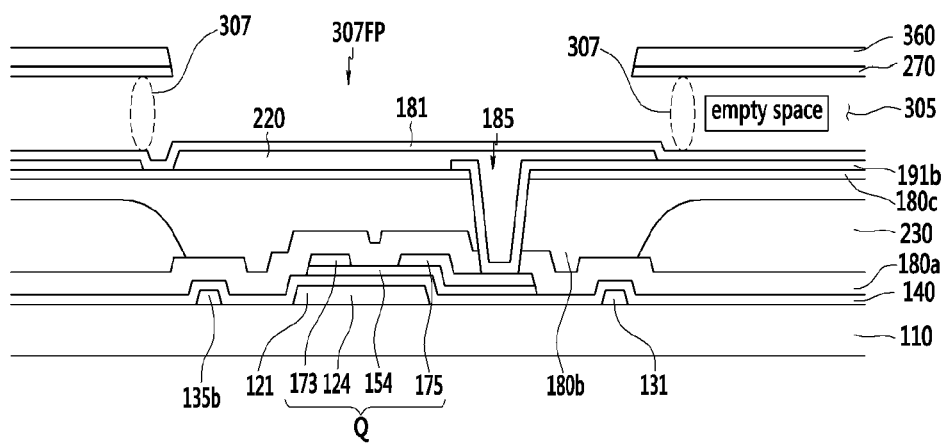
Figure 23:
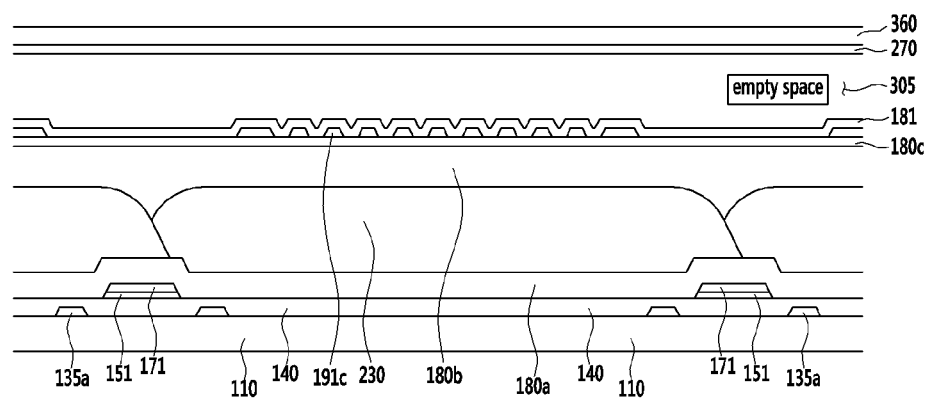

Referring to FIGS. 22 and 23, the sacrificial layer 300 is removed by an oxygen ($O_2$) ashing process, a wet etching method, or the like through the trench 307FP. In this case, an empty space 305 is formed where the sacrificial layer 300 covered the pixel row. The inlet part 307 is formed at the interface between the trench 307FP and the space 305. In addition, the sacrificial layer 300 portion surrounded by the protrusion 360p of the roof layer described in FIG. 21 is removed, such that the agglomeration induction part 305a described in FIG. 4, etc., may be formed.

Figure 24:
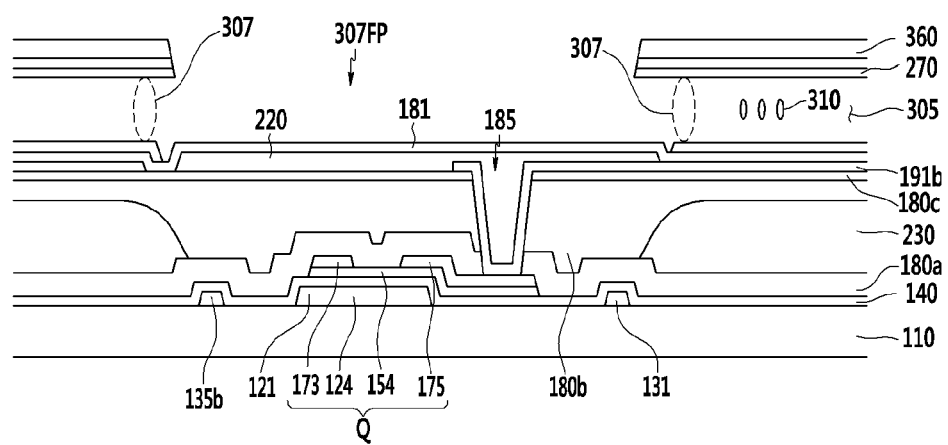
Figure 25:
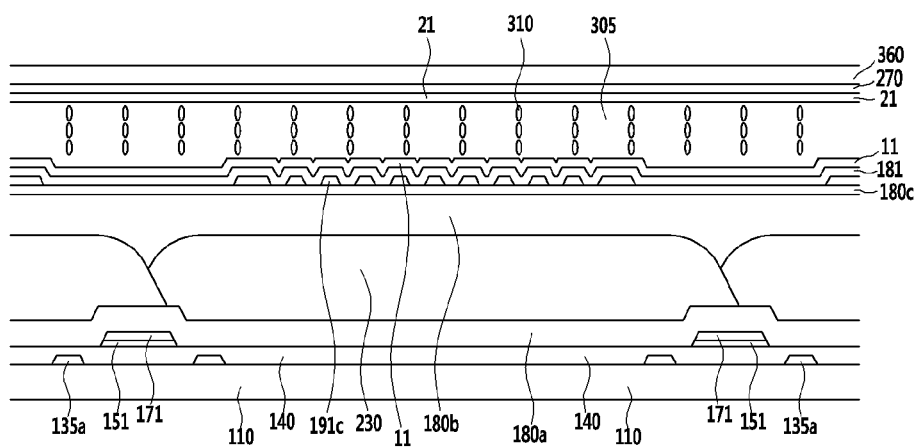

Referring to FIGS. 24 and 25, the alignment layers 11 and 21 are formed on the pixel electrode 191 and the common electrode 270 by injecting the alignment material through the inlet part 307. Specifically, after the alignment material is injected through the inlet part 307, a bake process is performed to evaporate the solvent of the alignment material, leaving behind any previously-dissolved solids and thus forming the alignment layers 11 and 21.

Next, the liquid crystal material including the liquid crystal molecules 310 is injected into the plurality of spaces 305 through the inlet part 307 using an inkjet method, or the like.

Next, the capping layer 390 is formed on the roof layer 360 so as to cover the inlet part 307, the trench 307FP, and the roof layer 360 if desired. The liquid crystal display shown in FIGS. 4 to 7 may thus be formed.

FIGS. 26 to 29 are plan views showing processes in which an alignment material is dried in the manufacture of a liquid crystal display according to an exemplary embodiment of the present disclosure.

Figure 26:
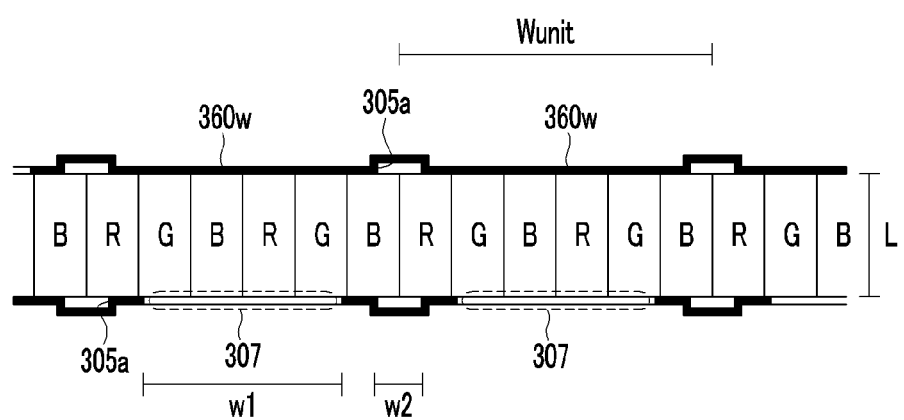
FIGS. 26 to 29 are plan views showing processes in which an alignment material is dried in the manufacturing method for a liquid crystal display according to an exemplary embodiment of the present disclosure.

Referring to FIG. 26, the pixel row of the liquid crystal display according to the present exemplary embodiment includes a red pixel R, a green pixel G, and a blue pixel B. Simulation results have demonstrated that, in the case in which a width w1 of the inlet part 307 is smaller than a long side L of the pixel, a dry induction phenomenon does not occur in the agglomeration induction part 305a. Therefore, according to the present exemplary embodiment, it is preferable to design the width w1 of the inlet part 307 to be larger than the long side L of the pixel. In addition, in the case in which an interval Wunit between adjacent agglomeration induction parts 305a is smaller than short sides of six pixels, a case in which the dry induction phenomenon does not occur in the agglomeration induction part 305a has occurred in several simulations. Therefore, it is preferable for the length Wunit between the midpoints of adjacent agglomeration induction parts 305a to be greater than or equal to six times the length of the short side of a pixel.

Hereinafter, the dry induction phenomenon will be described with reference to FIGS. 27 to 29.

Figure 27:
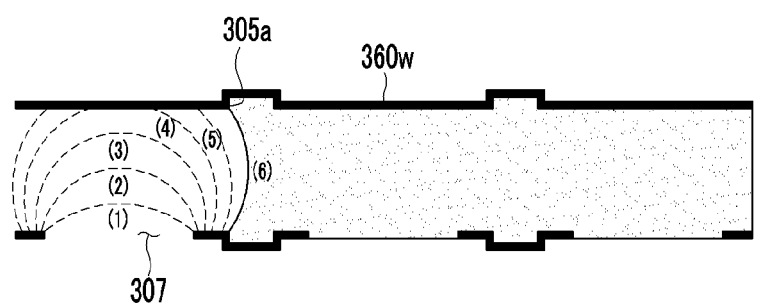
Figure 28:
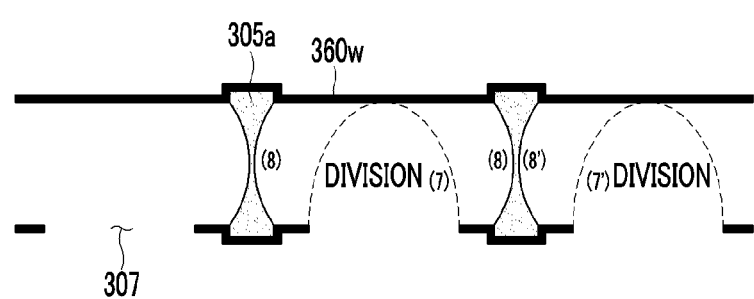
Figure 29:
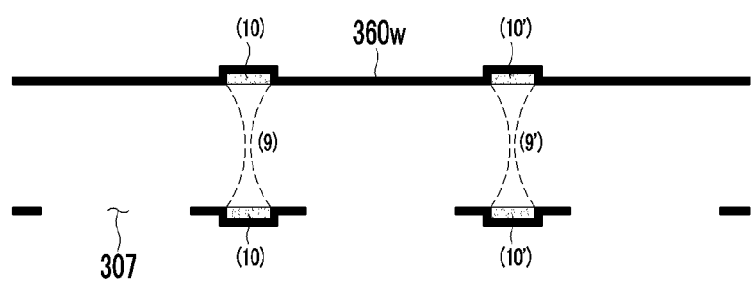

Referring to FIGS. 27 to 29, a dry operation is performed at a first left inlet part 307 (steps 1 and 2), and an alignment material fluid dries to the point that it begins to expose the side of the opposite partition 360w (step 3). With continued drying, the interface or fluid surface continues to retreat from the inlet part 307 (steps 4 and 5) until the surface of the alignment material fluid first touches one or more agglomeration induction parts 305a (step 6). This process is repeated at a neighboring inlet part 307 (steps 7 and 8). After the configuration of FIG. 28 is achieved, further drying of each of the inlet parts 307 (i.e. both sides of each agglomeration of alignment material fluid) results in the excess alignment material being deposited in the agglomeration induction parts 305a (steps 9 and 10).

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

<Description of symbols>

| | | | |
|---|---|---|---|
| 300 | sacrificial layer | 305a | agglomeration induction part |
| 307 | inlet part | 360 | roof layer |
| 360w | partition | 390 | capping layer |

What is claimed is:

1. A liquid crystal display comprising:
a substrate;
a plurality of thin film transistors disposed on the substrate;
a plurality of pixel electrodes connected to the plurality of thin film transistors respectively;
a roof layer facing the plurality of pixel electrodes; and
a liquid crystal layer comprising liquid crystal molecules disposed in a plurality of cavities between the plurality of pixel electrodes and the roof layer,
wherein the roof layer comprises partitions which extend substantially parallel to a gate line and are disposed between adjacent cavities, each of the partitions covering side part of the adjacent cavities, respectively,
wherein at least one of the partitions includes inlet parts which expose only part of the plurality of cavities, and
each cavity corresponds to a pixel row disposed along a direction in which the gate line extends and includes an agglomeration induction part that protrudes outward therefrom, wherein the agglomeration induction part is surrounded by a protrusion part of the partitions and disposed at a left or right side of the inlet parts along the direction in which the gate line extends.

2. The liquid crystal display of claim 1, wherein: the roof layer comprises at least one inorganic layer.

3. The liquid crystal display of claim 2, wherein:
a portion of the roof layer that overlaps a data line connected to the thin film transistor is planarized.

4. The liquid crystal display of claim 3, further comprising:
a capping layer disposed on the roof layer, wherein the capping layer covers a trench disposed between adjacent cavities.

5. The liquid crystal display of claim 4, wherein:
the roof layer has a first side with the inlet parts disposed therein, the capping layer covering the inlet parts.

6. The liquid crystal display of claim 5, wherein:
the roof layer has a second side opposite to the first side, and at least one of the first and second sides has the inlet parts.

7. The liquid crystal display of claim 6, wherein:
the inlet parts comprise first inlet parts disposed on the first side and second inlet parts disposed on the second side, and
the first inlet parts and the second inlet parts are arranged in alternating manner.

8. The liquid crystal display of claim 6, wherein:
the inlet parts include first inlet parts disposed on the first side and second inlet parts disposed on the second side, and
the first inlet parts and the second inlet parts have different widths.

9. The liquid crystal display of claim 1, wherein: the agglomeration induction part comprises a first agglomeration induction part and a second agglomeration induction part that are respectively disposed on a first side and an opposite second side of the each cavity.

10. The liquid crystal display of claim 9, wherein:
the first agglomeration induction part and the second agglomeration induction part face each other, and the liquid crystal display further comprises pillars disposed within the corresponding cavity between the first agglomeration induction part and the second agglomeration induction part.

11. The liquid crystal display of claim 1, wherein: the agglomeration induction part overlaps the trench.

* * * * *